May 21, 1946.   C. R. ALDEN   2,400,729
HYDRAULIC TRANSMISSION FOR MACHINE TOOLS
Original Filed March 17, 1932   10 Sheets-Sheet 1

Inventor
Carroll R. Alden
By Chindall, Parker & Carlson
Attorneys

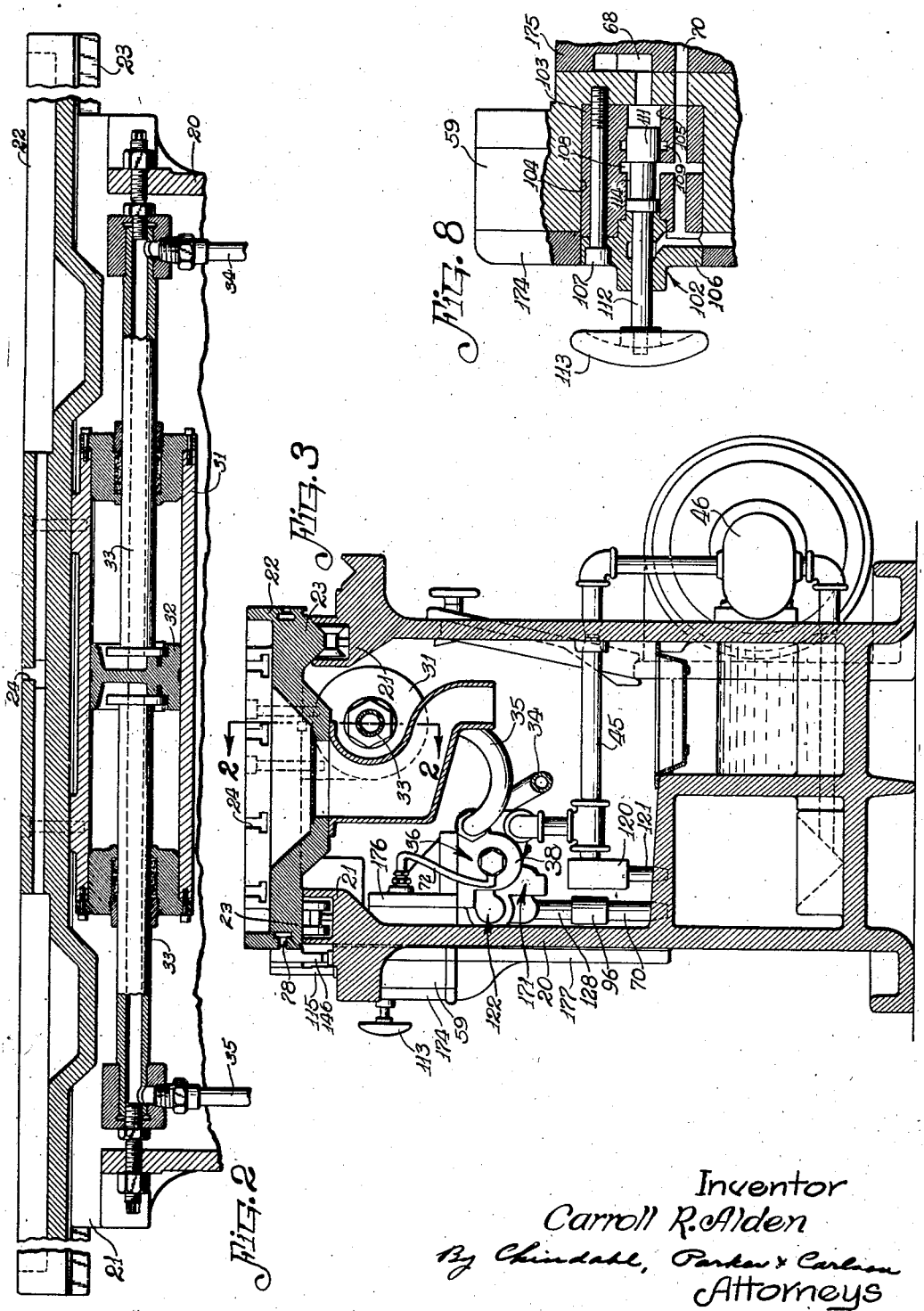

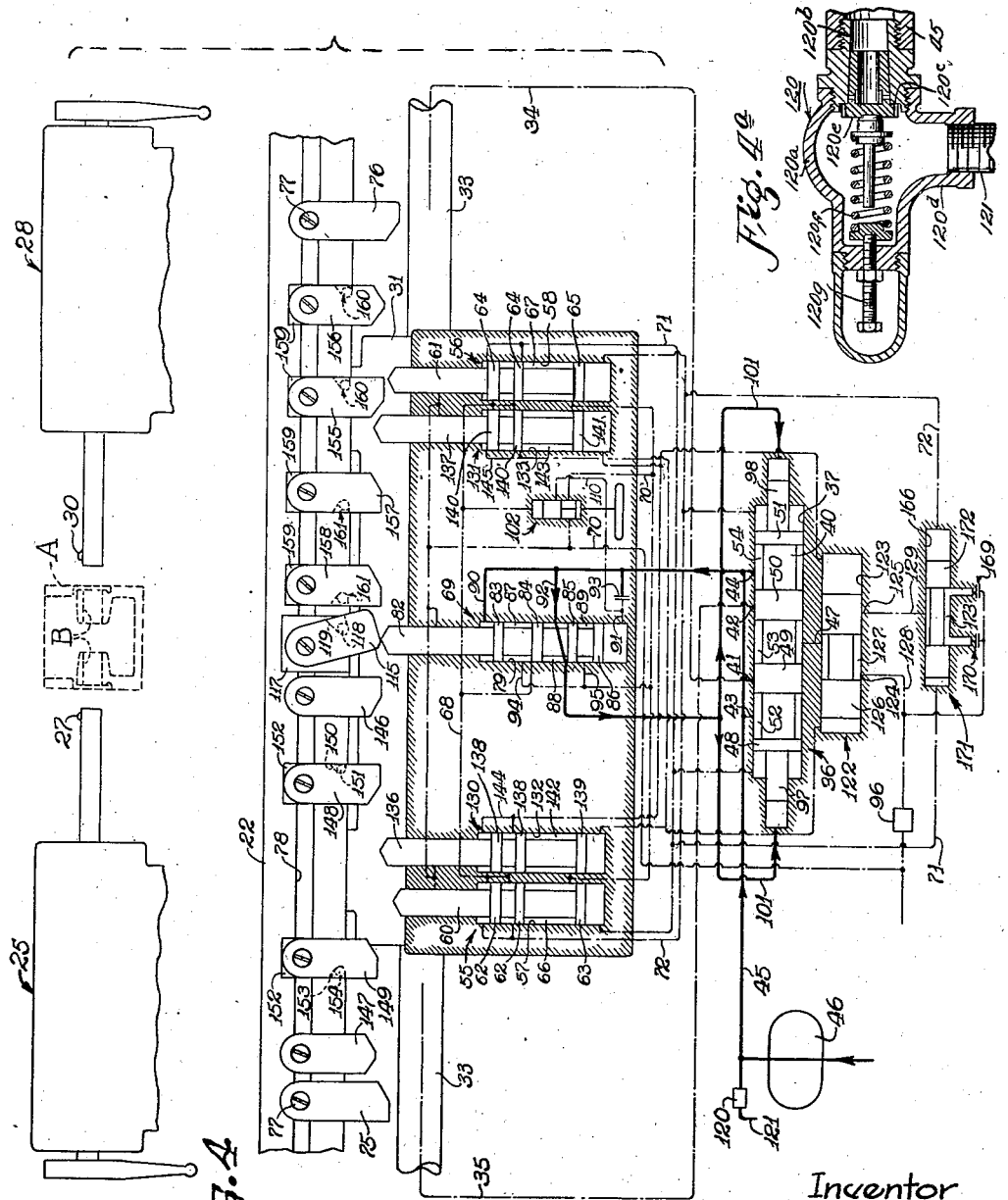

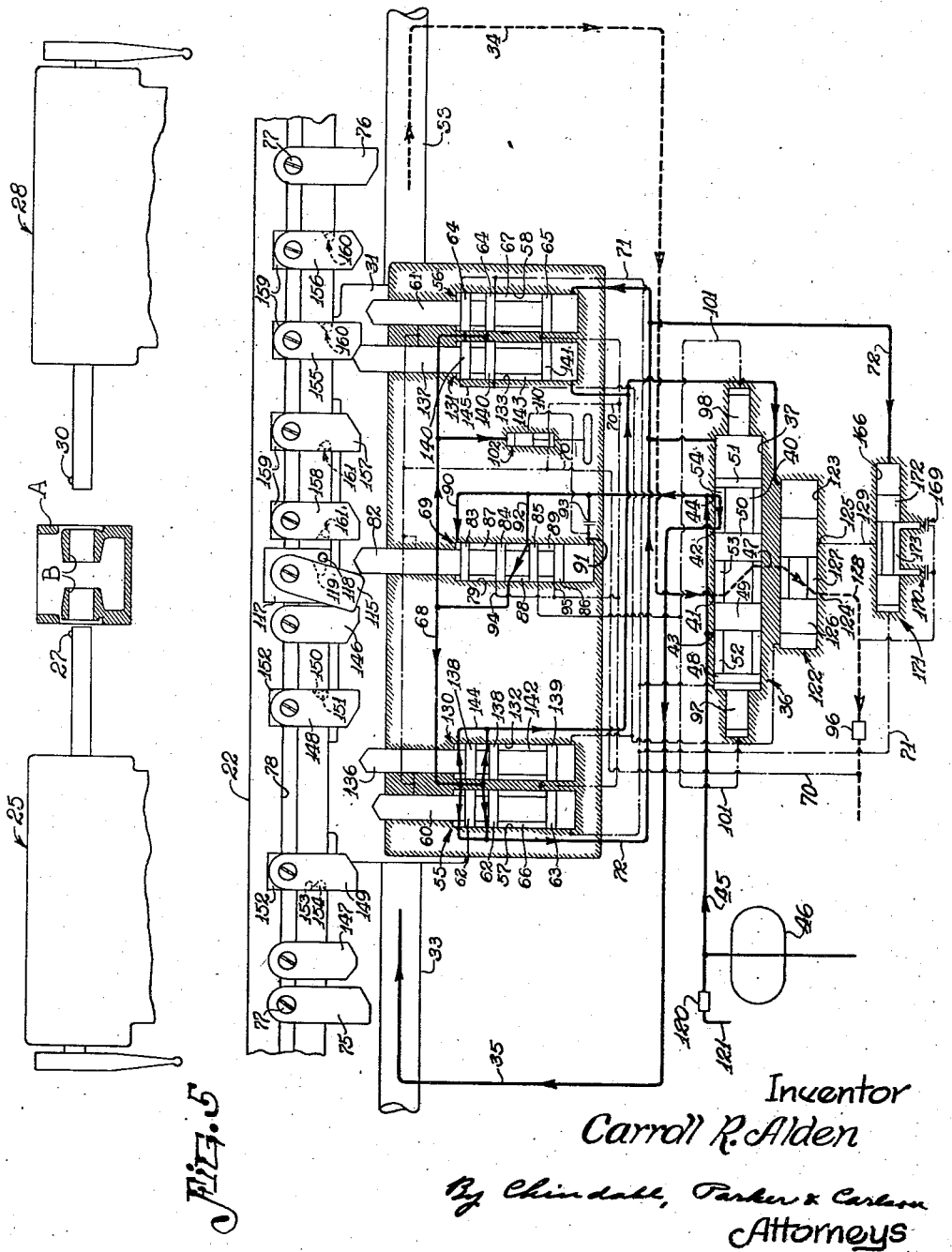

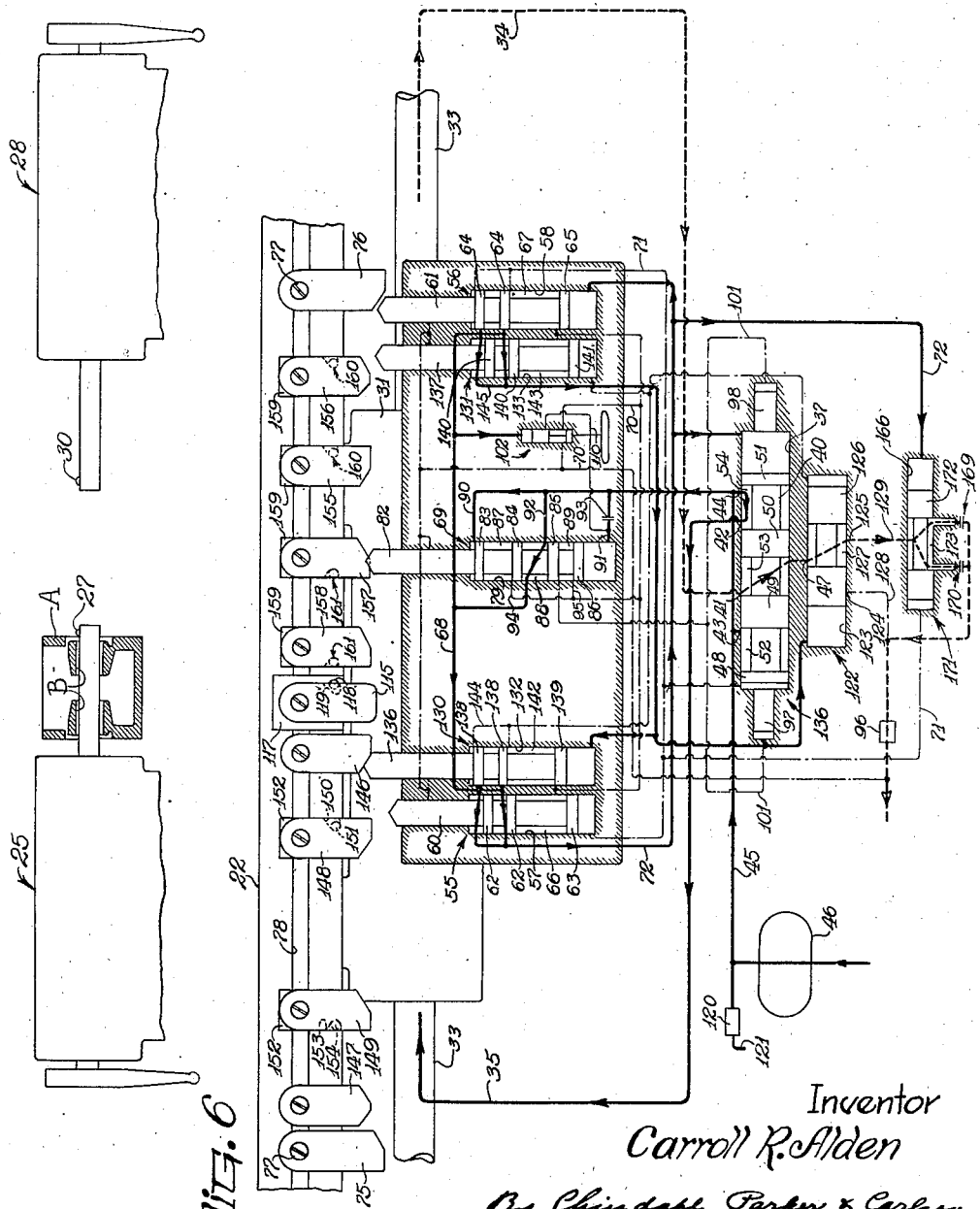

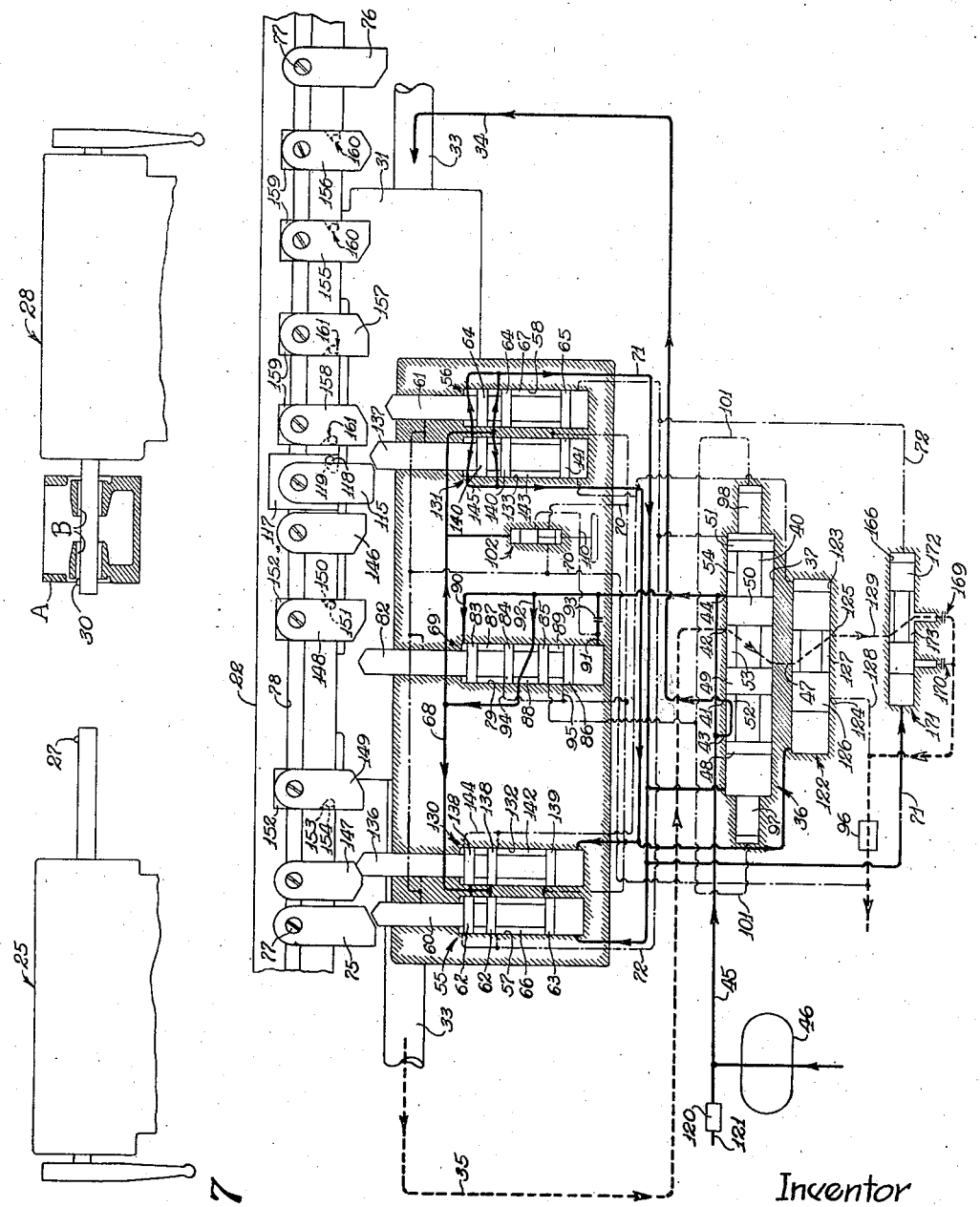

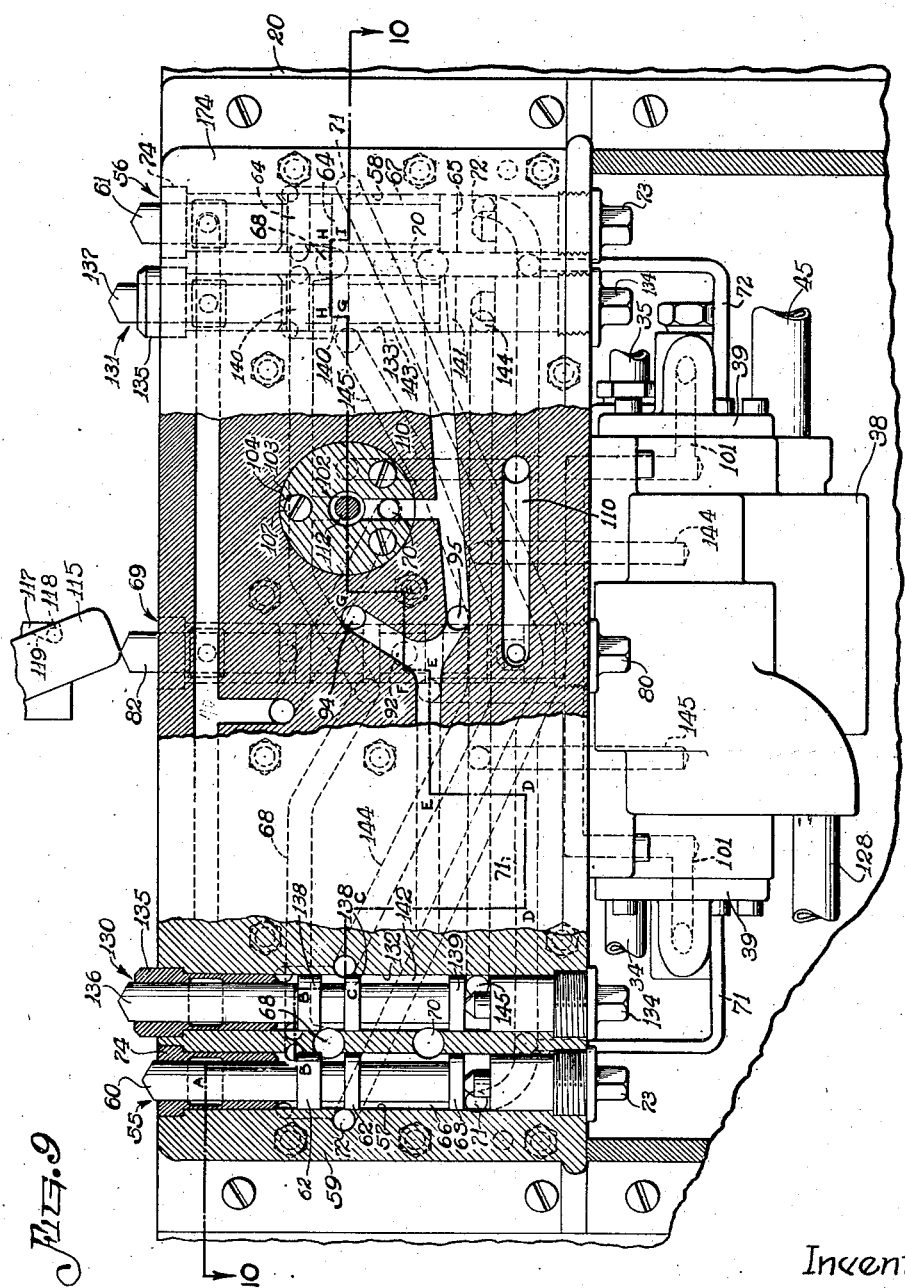

May 21, 1946.　　　C. R. ALDEN　　　2,400,729
HYDRAULIC TRANSMISSION FOR MACHINE TOOLS
Original Filed March 17, 1932　　10 Sheets-Sheet 8

Inventor
Carroll R. Alden
By Chindahl, Parker & Carlson
Attorneys

May 21, 1946.  C. R. ALDEN  2,400,729
HYDRAULIC TRANSMISSION FOR MACHINE TOOLS
Original Filed March 17, 1932  10 Sheets-Sheet 9

Inventor
Carroll R. Alden
By Chindahl, Parker & Carlson
Attorneys

May 21, 1946.     C. R. ALDEN     2,400,729
HYDRAULIC TRANSMISSION FOR MACHINE TOOLS
Original Filed March 17, 1932     10 Sheets-Sheet 10
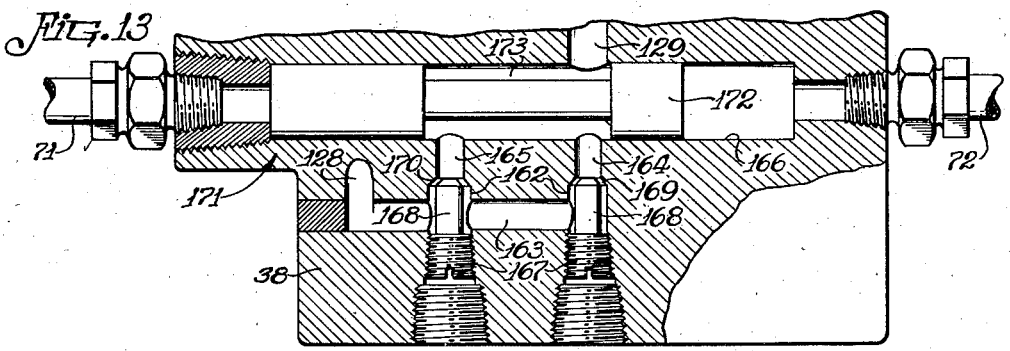
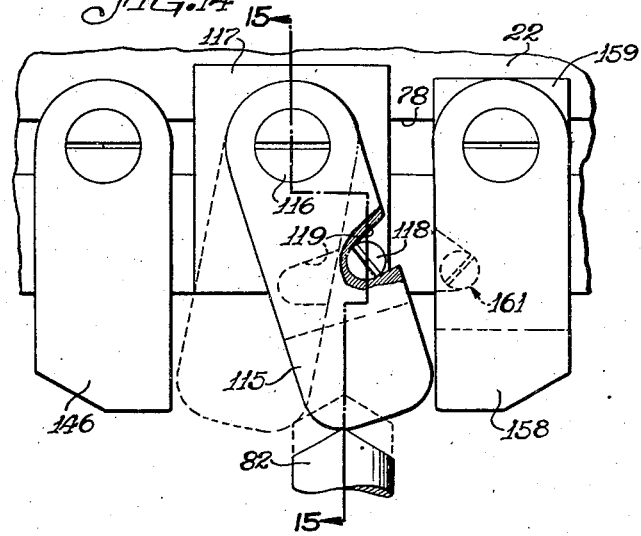
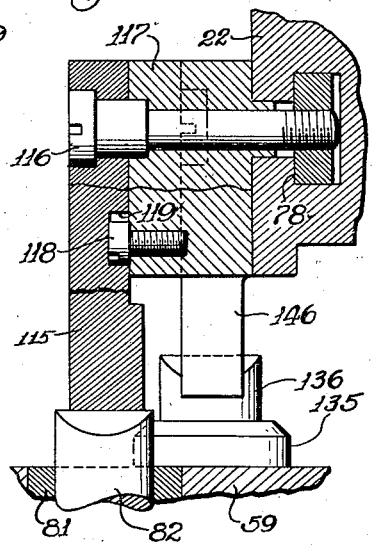
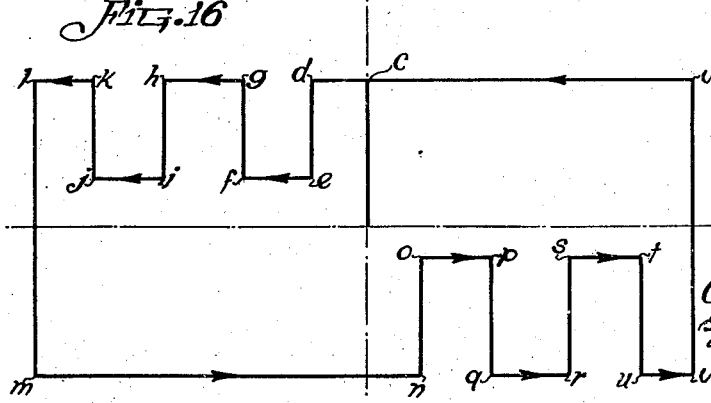
Inventor
Carroll R. Alden
Attorneys Patented May 21, 1946

2,400,729

UNITED STATES PATENT OFFICE 2,400,729

HYDRAULIC TRANSMISSION FOR MACHINE TOOLS

Carroll R. Alden, Detroit, Mich., assignor to Ex-Cell-O Corporation, a corporation of Michigan Original application March 17, 1932, Serial No. 599,427, now Patent No. 2,000,553, dated May 7, 1935. Divided and this application September 22, 1933, Serial No. 690,525

32 Claims. (Cl. 60—52)

The present invention relates to improvements in machine tools, and has particular reference to a novel hydraulic transmission for driving some translatory power element, such for example as a reciprocatory carriage, of a machine tool. The present application is a division of my copending application Serial No. 599,427, filed March 17, 1932 (Patent No. 2,000,553).

One of the objects of the present invention resides in the provision of a novel hydraulic transmission for driving a reversible translatory machine tool element, in which the speed of travel of the element in both directions of traverse is controlled by the rate of discharge from the exhaust end of the hydraulic motor, and more specifically by connecting the exhaust end of the hydraulic motor automatically either to an unrestricted discharge passage to obtain a rapid traverse, or to a discharge passage including a flow restriction to obtain a slow feed.

A further object of the invention is to provide a plurality of restricted flow controlling feed orifices, and means for connecting the orifices selectively in the discharge passage to vary the rate of feed.

Another object resides in the provision in a new and improved hydraulic transmission for driving the translatory element, of a direction valve, an hydraulic pilot reset mechanism operable by dogs on the element to control the position and operation of the direction valve, and an hydraulic control valve adapted upon movement into inoperative position to render the pilot reset mechanism inoperative and to effect automatic movement of the direction valve into neutral position.

Still a further object resides in the provision in the hydraulic circuit of a speed control valve, and an hydraulic reset mechanism operable by dogs on the translatory element for effecting automatic adjustment of the speed valve.

A general object of the invention resides in the provision of a novel pilot reset mechanism which comprises two pressure fluid responsive valves, each of which has an actuating member movable into an operative or an inoperative position, and which have inter-connecting fluid conduits whereby upon movement of either member into inoperative position, the other member will automatically be moved into operative position.

Further objects and advantages will become apparent as the description proceeds.

In the accompanying drawings,

Figure 2 is a fragmentary longitudinal sectional view of the machine tool through the hydraulic motor taken along line 2—2 of Fig. 3.

Fig. 3 is a fragmentary transverse sectional view of the machine tool with the spindle supports removed taken along line 3—3 of Fig. 1.

Fig. 4 is a diagrammatic representation of the hydraulic system for the carriage, showing the parts in the automatic stop position.

Fig. 4ª is a cross sectional view of a conventional working pressure relief valve forming part of the hydraulic system.

Figure 5 is a view similar to Fig. 4, but showing the parts in the positions occupied to effect rapid movement of the carriage to the left.

Fig. 6 is a view similar to Fig. 5, but showing the parts adjusted to effect a slow feed to the left.

Fig. 7 is a view similar to Figs. 5 and 6, but with the parts adjusted to effect a slow feed of the carriage to the right.

Figure 1:
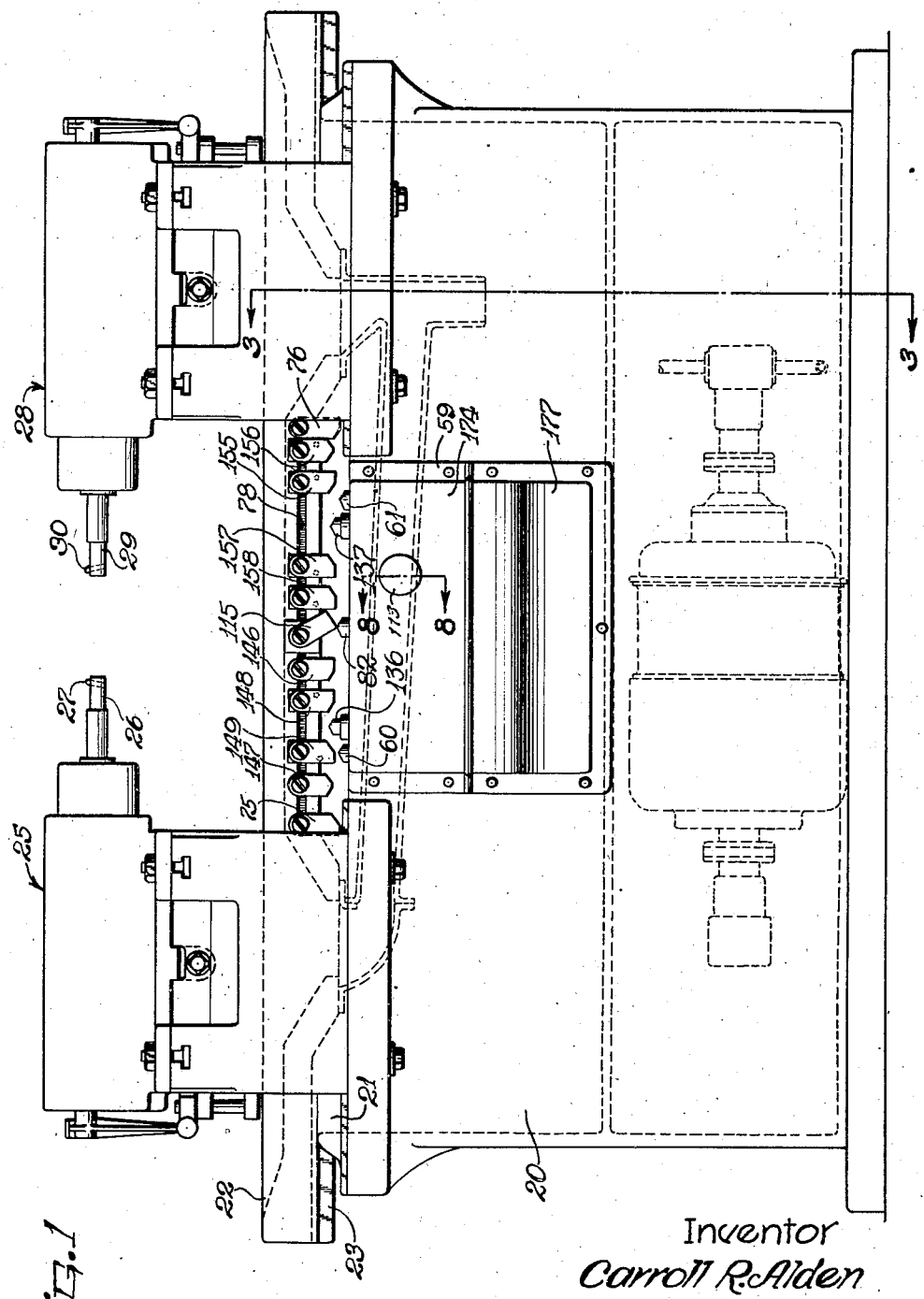
Figure 1 is a front view of a machine tool provided with an hydraulic transmission embodying the features of my invention.

Fig. 8 is a fragmentary sectional view taken along line 8—8 of Fig. 1, of the manual control valve.

Fig. 9 is an enlarged fragmentary view, partially in section, of the hydraulic control panel.

Figure 10:
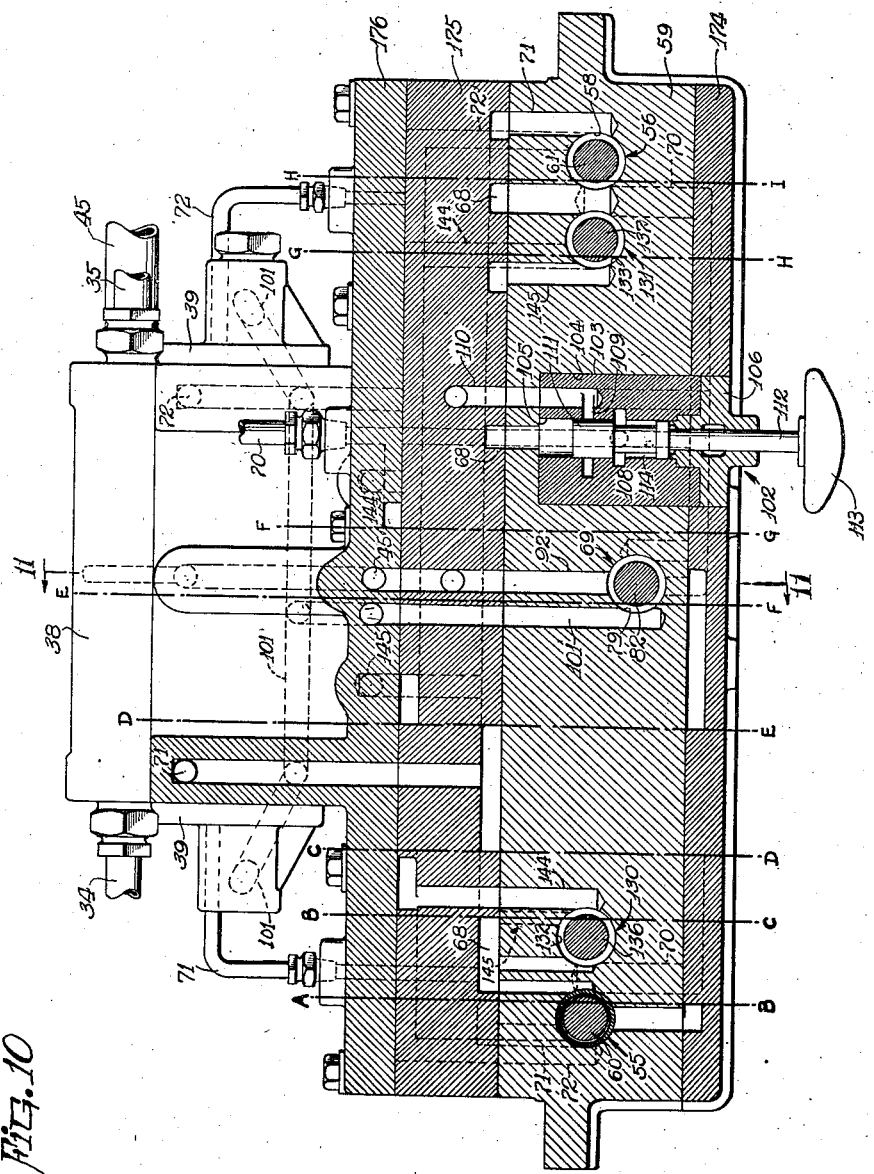

Fig. 10 is a composite horizontal sectional view of the panel taken along broken line 10—10 of Fig. 9.

Figure 11:
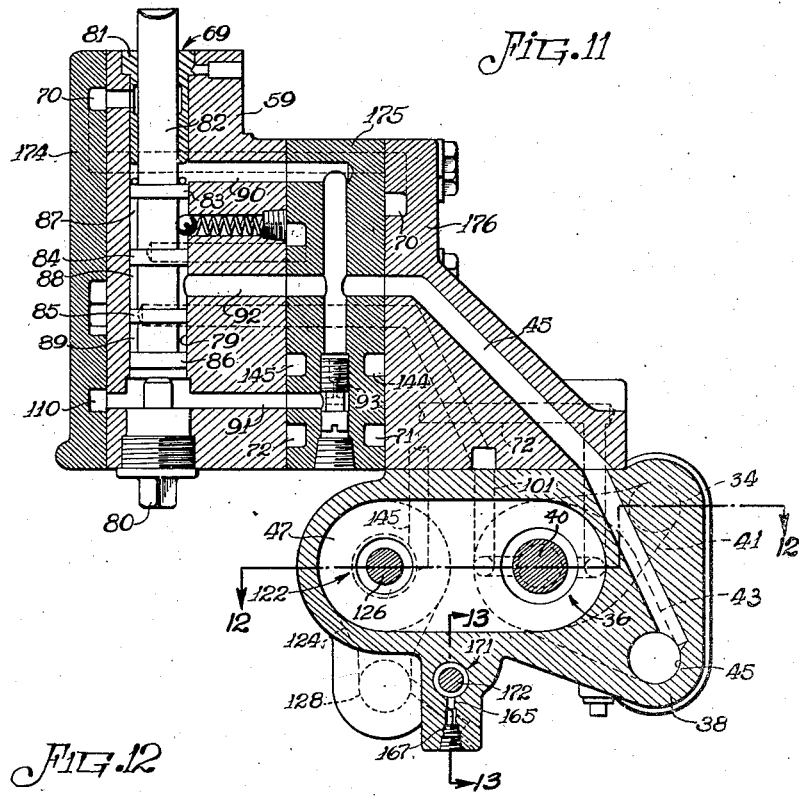

Fig. 11 is a transverse vertical sectional view taken along line 11—11 of Fig. 10.

Figure 12:
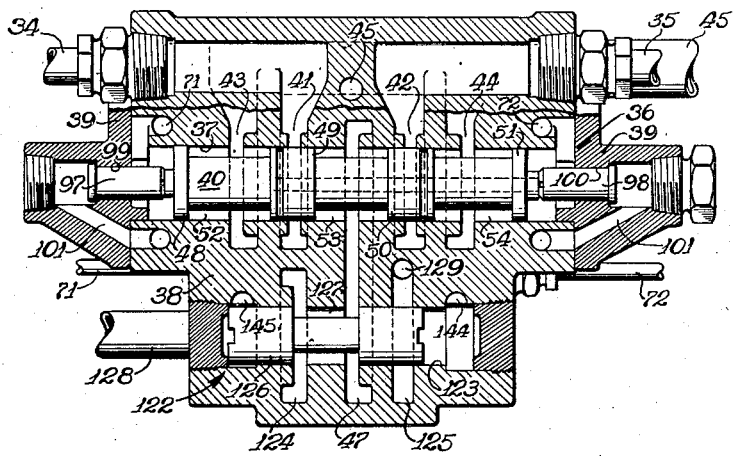

Fig. 12 is a horizontal sectional view taken along broken line 12—12 of Fig. 11.

Fig. 13 is an enlarged fragmentary vertical sectional view taken along line 13—13 of Fig. 11.

Fig. 14 is a fragmentary view on an enlarged scale of the table control dogs.

Fig. 15 is a fragmentary sectional view taken along line 15—15 of Fig. 14.

Fig. 16 is a diagram illustrating the cycle of table movement.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the machine in its preferred form comprises an elongated hollow base 20. Formed on the top of the base 20 are two parallel spaced longitudinal ways 21 (Figs. 1 to 3), one of which is flat and the other of which is V-shaped. A table or carriage 22 is formed on the underside with ways 23 mounted on the ways 21 for horizontal translation or reciprocation. Preferably, the carriage 22 is adapted to support the work to be machined, and hence is provided with a flat upper mounting surface formed with T-slots 24 for securing the work or work fixtures in position.

Mounted on one end of the base 20 is a tool spindle supporting structure 25 in which one or more spindles 26, extending inwardly over the work carriage 22 and each provided with a suitable metal cutting tool 27, are journaled. A similar structure 28, rotatably supporting one or more spindles 29 extending inwardly over the other end of the carriage 22 and in respective alinement with the spindles 26 and each provided with a suitable metal cutting tool 30, preferably is mounted on the other end of the base 20 so that the carriage 22 upon movement in opposite directions between the structures may bring the work into cooperative relation alternately with the tools 27 and 30.

While the invention is not limited to any specific type of machine tool, it is herein illustrated in connection with a horizontal diamond boring machine. Such machine is especially useful in accurately boring the wrist pin holes of engine pistons, the ends of connecting rods and the hubs of single or cluster gears, etc. The tools 27 and 30 are accordingly shown as fly tools, of any suitable material such as diamonds, tungsten carbide etc., mounted in the free ends of the spindles 26 and 29, and adjustable laterally thereof to obtain the desired dimension of revolution.

For each set of opposed spindles 26 and 29, one or more work pieces may be mounted on the carriage 22. Thus, if two separate work pieces are positioned in proper alinement with the spindles 26 and 29, one piece may be machined upon movement of the carriage 22, in one direction, i. e. to the left into operative relation with the associated spindle 26, and the other piece may be machined upon movement of the carriage in the opposite direction. While one piece is being operated upon, the other finished piece may be replaced by a new piece so that the operation of the machine may be continuous.

The fly tools 27 and 30 may be adjusted to take relatively different depths of cut, and the work may be so mounted that upon movement of the carriage 22 in one direction, one tool will take a roughing cut, and upon movement of the carriage in the opposite direction, the other tool will take a finishing cut. Either a single work piece or a plurality of alined work pieces may be operated on.

In the present instance, a single engine piston A (see Figs. 4 to 7), having two diametrically alined wrist pin holes B to be bored, is mounted, as by means of a suitable fixture (not shown), on the carriage 22 between the tools 27 and 30. Movement of the carriage to the left, causes the tool 27 to take a roughing cut in both holes B, and reverse movement of the carriage causes the tool 30 to take a finishing cut in both holes.

The two spindle supporting structures 25 and 28 preferably are alike in construction, and are described in detail in my aforesaid patent. While one specific form of machine is shown and described, it will be understood that the invention in its broad aspects is not limited to the specific character or use of the translatory power element 22 or to the general organization and structural details of the machine.

A novel hydraulic transmission is provided for driving the carriage 22. The transmission is adapted to translate the carriage 22 automatically at any desired variation of speeds, as for example at a rapid traverse whenever the tools are not taking a cut, a slow feed during a roughing cut and a still slower feed during a finishing cut, and tends to maintain substantially constant any predetermined feed regardless of any variations in the cutting resistance likely to occur in practice.

In its preferred form, the transmission comprises an hydraulic motor (see Fig. 2) having a cylinder 31 mounted below the carriage 22 within the base 20. Reciprocably disposed within the cylinder 31 is a piston 32 supported by two piston rods 33 which extend slidably through the closed opposite ends of the cylinder 31. Preferably, the cylinder 31 is rigidly attached to the underside of the carriage 22, and the piston rods 33 are secured at their outer ends to the base 20. The opposite ends of the cylinder 31 are connected through the piston rods 33 respectively to two fluid conduits 34 and 35 leading to a direction valve 36.

The direction valve 36 (Figs. 11 and 12) may be of any desired construction, and preferably comprises an elongated cylinder bore or valve chamber 37 formed in a casing 38 and closed at the ends by means of plates 39. A valve piston 40 of the spool type is mounted for reciprocation in the bore 37. Formed in the peripheral wall of the valve bore 37 are two axially spaced annular ports 41 and 42 connected respectively to the conduits 34 and 35. Two inlet ports 43 and 44 located respectively beyond the ports 41 and 42 are also formed in the valve bore 37, and are constantly connected through a pressure fluid supply conduit 45 to a suitable source of pressure fluid, such as a low pressure gear pump 46 (Fig. 4). Formed in the valve bore 37 intermediate the ports 41 and 42 is an annular exhaust port 47. The valve piston 40 is formed with four longitudinally spaced peripheral collars or heads 48, 49, 50, and 51 defining peripheral spaces 52, 53 and 54.

It will be evident that upon movement of the valve piston 40 to the left (Figs. 5 and 6), the space 54 will connect the ports 42 and 44 to supply pressure fluid to the conduit 35 leading to the left end of the cylinder 31, and the space 53 will connect the ports 41 and 47 to establish communication of the conduit 34 from the right end of the cylinder 31 with the exhaust, thus instituting movement of the carriage 22 to the left. Upon reversing the position of the valve piston 40 (Fig. 7), the spaces 52 and 53 will respectively connect the ports 41 and 43 and the ports 42 and 47 to reverse the connections of the conduits 34 and 35 so as to cause the carriage 22 to travel to the right.

An automatic reset pilot mechanism responsive to the movements of the carriage 22 is provided for reversing the direction valve 36. The pilot mechanism comprises two valves 55 and 56 for effecting reversal of the work carriage 22 respectively to the left and right. The valves 55 and 56 (Figs. 4 to 7) respectively comprise vertical valve bores or chambers 57 and 58 (Fig. 9) which may be formed in any suitable casings, and which in the present instance are formed in a plate or apron 59 constituting a panel secured to the front wall of the base 20. Slidably disposed in the respective valve bores 57 and 58 are two valve plungers 60 and 61 of the spool type formed respectively with spaced upper and lower peripheral collars or heads 62 and 63, and 64 and 65 defining annular spaces 66 and 67. The upper end portions of the bores 57 and 58 are adapted to be connected with or disconnected from a branched conduit 68 by the collars 62 and 64, and the conduit 68 in turn is adapted to be connected through a stop valve 69 either to the source of pressure fluid or the exhaust.

The bores 57 and 58, intermediate the collars 62 and 63, and 64 and 65, regardless of the positions of the plungers 60 and 61, are always in communication with the drain through a branched exhaust conduit 70. A cross conduit 71 opens at one end to the bottom of the bore 57, and at the other end always to the top of the bore 58 above the head 64 for connection through movement of the head 64 either with the conduit 68 or the exhaust conduit 70. Likewise, a cross conduit 72 opens at one end to the bottom of the bore 58, and at the other end to the top of the bore 57 above the head 62 for communication through movement of the head 62 either with the conduit 68 or the exhaust conduit 70. The cross conduits 71 and 72 also open respectively to the left and right ends of the main direction valve bore 37.

The bores 57 and 58 (Fig. 9) preferably open vertically through the plate 59, and are closed at their lower ends by plugs 73 and at their upper ends by sleeves 74 through which the upper ends of the plungers 60 and 61 slidably extend. It will be evident that the plungers 60 and 61 constitute differential pistons which will assume their uppermost positions whenever subjected to pressure fluid at both ends or at their lower ends, and will assume their lowermost positions when subjected to pressure on their upper ends only.

The upper outer ends of the plungers 60 and 61 are beveled to constitute reversing abutments adapted for engagement by suitable control dogs 75 and 76 with inclined faces mounted on the front of the carriage 22. The dogs 75 and 76 are rigidly clamped in position by means of bolts 77 adjustably secured in a longitudinal T-slot 78 formed in the front of the carriage 22. The location and spacing of the dogs 75 and 76 on the carriage 22 is dependent on the desired extent and range of reciprocation.

Assuming that the stop valve 69 is adjusted to connect the conduit 68 to the source of pressure fluid (Figs. 5 to 7), and that the right-hand plunger 61 is in its uppermost position (Figs. 5 and 6), pressure fluid from the conduit 68 will then be transmitted through the upper end of the valve bore 57 and the cross conduit 72 to the lower end of the valve bore 58 and right end of the direction valve bore 37; and the lower end of the valve bore 57 and left end of the direction valve bore 37 will be connected through the conduit 71, the space 67 and the exhaust conduit 70 to the drain. Hence, the plunger 60 will occupy its lowermost position, and the valve piston 40 will be moved to the left to cause the carriage 22 to travel to the left (Figs. 5 and 6).

As the carriage 22 reaches its extreme left position, the dog 76 depresses the plunger 61 (Fig. 7), thereby breaking the exhaust connection from the lower end of the bore 57 and the left end of the valve bore 37, and establishing a connection therefrom to the pressure conduit 68. Thereupon, the plunger 60 is elevated into operative positions, thereby breaking the pressure connection to the lower end of the bore 58 and the right end of the valve bore 37, and establishing a connection therefrom to the exhaust. As a result, the valve piston 40 is moved to the right to reverse the movement of the carriage 22. Upon movement of the carriage 22 into its extreme right position, the dog 75 depresses the plunger 60, thereby reestablishing the initial connections and resetting the plunger 61.

The stop valve 69 (Fig. 11) is operable automatically or manually to interrupt the translation of the work carriage 22, and in its preferred form comprises a valve bore or chamber 79 opening vertically through the plate 59 between the valves 55 and 56, and closed at the bottom by a plug 80 and at the top by a sleeve 81. A valve plunger 82 of the spool type is reciprocably disposed in the bore 79, and extends upwardly through the sleeve 81 to the top of the plate 59. Formed on the plunger 82 are four longitudinally spaced peripheral collars or heads 83, 84, 85 and 86 which define three annular spaces 87, 88 and 89. The plunger 82 thus constitutes a differential piston which when subjected at both ends to the same pressure tends to assume its uppermost position.

The pressure supply conduit 45 is connected through three parallel branch conduits 90, 91 and 92 to the bore 79 respectively at the upper and lower ends and at an intermediate point. Interposed in the lower branch conduit 91 is a restricted orifice 93. The exhaust conduit 70 is connected through two parallel branch conduits 94 and 95 to the bore 79 at spaced points intermediate the conduits 90 and 92 and 91 and 92, respectively. A back pressure valve 96 is interposed in the discharge end of the system ahead of the exhaust conduit 70 and beyond the direction valve 36. The pressure conduit 68 for the pilot reset valves 55 and 56 is connected to the bore 79 at a point such that when the plunger 82 is in its uppermost position (Figs. 5 to 7), communication will be established therewith through the space 88 by the main supply conduit 45, and when the plunger is partially depressed (Fig. 4) or fully depressed, the conduit 68 will be cut off from the supply conduit and connected to the exhaust conduit 70. Obviously, fully lowering of the plunger 82 will maintain the connection of the conduit 68 through the space 87 with the exhaust conduit 70, and will therefore cause the ends of the main valve bore 37 to be connected to the exhaust conduit 70 through the valves 55 and 56.

Pressure responsive means is provided for automatically centering the valve piston 40 when the occasion arises. This means (Fig. 12) comprises two centering pistons 97 and 98 slidably disposed respectively in two bores 99 and 100 formed in the end plates 39, and adapted to engage the ends of the piston 40 when urged inwardly. The outer ends of the bores 99 and 100 are connected to a branched conduit 101 which opens to the bore 79 at a point such that it will communicate through the space 89 and branch conduit 95 with the exhaust conduit 70 when the plunger 82 is elevated (Figs. 5 to 7), and through the space 88 and branch conduit 92 with the supply conduit 45 when the plunger 82 is depressed (Fig. 4). It will be evident that when the stop valve plunger 82 is depressed to connect both ends of the main valve bore 37 to the exhaust conduit 70, and simultaneously to connect the conduit 101 to the supply conduit 45, the impressed pressure fluid in the bores 99 and 100 will force the centering pistons 97 and 98 into their innermost positions, thus causing self-centering of the main valve piston 40 (Fig. 4) to interrupt the conduit connections to the carriage cylinder 31.

Downward movement of the stop plunger 82 may be effected at will by means of a manual control which in the present instance consists of a hand valve 102 (Fig. 8). Preferably, the valve 102 comprises a cylindrical casing 103 which is fitted in a transverse recess 104, in the front side of the apron 59 and which has an axial valve bore 105. A plate 106 serves to close the front end of the bore, and the casing 103 and the plate 106 are secured in assembled relation and in position in the recess 104 by means of bolts 107. The bore 105 is connected at its inner end to the conduit 68, and is formed at spaced points along its length with annular ports 108 and 109 connected respectively to the exhaust conduit 70 and a conduit 110 opening into the lower end of the bore 79 beneath the stop plunger 82. A valve plunger 111 is slidably mounted in the bore 105, and has a stem 112 extending through the plate 106 and provided with an actuating knob 113. The plunger 111 is formed with a peripheral space 114 adapted either to connect or disconnect the conduits 70 and 110. Obviously, upon actuating the valve 102 to connect the conduits 70 and 110, the lower end of the bore 79 will be opened to the exhaust, and due to the orifice 93 a substantial pressure reduction will occur beneath the stop plunger 82, thereby causing the latter to descend to stop the work carriage 22. Upon actuating the valve 102 to disconnect the conduits 70 and 110, the supply pressure will again be established on the underside of the stop plunger 82, thus causing the latter to return upwardly into operative position.

Where a roughing cut and a finishing cut are to be taken upon movement of the work carriage 22 in opposite directions, it is desirable to provide means for automatically stopping the carriage upon movement thereof after the finishing cut into central or neutral position. This means (Figs. 14 and 15) comprises a pivotal drop pawl or dog 115 movable with the work carriage 22, and adapted to engage the upper beveled end of the stop plunger 82. The dog 115 is pivotally mounted by means of a bolt 116 on a plate 117 secured to the front of the carriage 22 for adjustment along the T-slot 78. A forwardly projecting pin 118 on the plate 117 is adapted for engagement in a slot 119 formed in the right side of the dog 115 to limit pivotal movement of the latter in that direction. The stop plunger 82 and the dog 115 are located forwardly out of range of the reverse plungers 60 and 61, and preferably for engagement midway of the work carriage 22.

It will be evident that the dog 115 is movable to the right past the stop plunger 82 without depressing the latter, but upon movement of the carriage 22 to the left into the neutral or loading position, will depress the plunger against the upwardly directed pressure differential to stop the carriage. The plunger 82 is not depressed into its lowermost position or sufficiently to release the dog, although the slight pivotal movement permitted by the pin 118 causes the pivotal center to be located to the left of the plunger. However, the plunger 82 is depressed sufficiently to connect the conduit 68 through the space 87 and branch conduit 94 to the conduit 70, and to connect the conduit 101 to the branch pressure conduit 92, thereby stopping the carriage. To again institute operation of the carriage 22, as for a succeeding cycle, the hand valve 102 is actuated manually to connect the conduits 70 and 110, thereby causing the plunger 82 to drop into its lowermost position. The dog 115 is thereby released and drops to the left of the plunger 82. The valve 102 is now actuated manually to effect return of the plunger 82 to operative position, whereupon the work carriage 22 is caused to move to the left and through another cycle.

The work carriage 22 is adapted to be driven automatically at variable speeds, for example at a rapid traverse when neither of the tools 27 and 30 is in operative contact with the work, and at a slow feed when either tool is in cutting engagement with the work. Thus, for the blank A, the carriage 22 is moved, as illustrated graphically in Fig. 16, wherein the abscissas represent the extent of the carriage movement to the left and right of the neutral position and the ordinates indicate the speed of travel to the left and right, through the following cycle: from the central starting position c to the left at a rapid traverse along c—d until the tool 27 is about to contact with the leading hole B; at a slow feed along e—f while the leading hole B is being rough bored; at a rapid traverse along g—h while the tool 27 is crossing the space between the holes B; at a slow feed along i—j while the trailing hole B is being rough bored; at a rapid traverse along k—l just before reversal; then upon reversal to the right, at a rapid traverse along m—n until the tool 30 is about to contact with the then leading hole B; at a slow feed along o—p while the then leading hole B is being finish bored; at a rapid traverse along q—r while the tool 30 is crossing the space between the holes B; at a slow feed along s—t while the then trailing hole B is being finished bored; at a rapid traverse along line u—v until reversal; and finally upon a reversal to the left, at a rapid traverse along w—c to the initial starting position. It will be noted that on the final traverse in each direction, the tool is caused to move slightly beyond the work before reversal so as to afford time to stop the tool if desired before commencing withdrawal past the center position. Preferably, the intermittent feeds to the right during the finishing cuts are somewhat slower than the corresponding roughing feeds to the left. While the carriage movements have been described as applied to a particular type of work piece, it will be understood that the programming of the carriage 22 may be varied to suit any desired problem without departing from the spirit and scope of the invention.

In the present instance, the impelling fluid pressure is maintained substantially constant, as for example by means of a pressure relief valve 120 interposed in a branch conduit 121 from the main supply conduit 45 to the drain, and the speed control is obtained by automatically regulating the rate of discharge of pressure fluid from the exhaust end, at any particular time, of the cylinder 31. The discharge of pressure fluid is so regulated that the speed of the work carriage 22 is maintained substantially constant during any feeding movement regardless of variations in resistance likely to occur in practice.

The relief valve 120 per se forms no part of the present invention, and may be of any suitable conventional form or type for maintaining a substantially constant maximum working pressure as is well known in the art. For purposes of illustration, I have shown in Fig. 4ª a conventional type of working pressure relief valve which comprises a housing 120ª having an inlet passage 120ᵇ connected to the line 45 and terminating in a valve port 120ᶜ and having an outlet 120ᵈ discharging to drain. A reciprocable valve member 120ᵉ is urged toward the port 120ᵇ by a coiled compression spring 120ᶠ. The spring seats at one end against a screw 120ᵍ which is adjustable to vary the tension of the spring and thereby working pressure. It will be readily understood that the pressure of the fluid in the line 45 acts against and tends to urge the valve member 120ᵉ from the port 120ᵇ against the predetermined pressure of the spring 120ᶠ, and that fluid will throttle past the valve member to limit the pressure in the line 45.

The specific means for controlling the speed of the carriage movements comprises a speed valve 122 (Figs. 11 and 12) to which the exhaust fluid from the main valve 36 is directed. The speed valve 122 preferably comprises a bore or chamber 123 which is formed in the casing 38 in parallel relation to the bore 37 and suitably closed at the ends. The exhaust port 47 of the main valve 36 opens in the peripheral wall of the bore 123 and constitutes the inlet port for the valve 122. Two annular discharge ports 124 and 125 are also formed in the bore 123 respectively at opposite sides of the port 47.

Reciprocably disposed in the bore 123 is a valve piston 126 of the spool type formed with an annular peripheral space 127 which is adapted upon movement of the piston respectively into opposite end positions to connect the inlet port 47 either to the discharge port 124 or the discharge port 125. The port 124 communicates with a substantially unrestricted discharge passage 128 connected to the exhaust conduit 70, while the port 125 is connected through a passage 129 with means hereinafter described for restricting the flow of fluid. It will be evident that with the piston 126 in its left-hand position, the carriage 22 will be movable at a rapid traverse, and that with the piston 126 in the opposed position, the carriage will be movable at a slow feed.

A reset pilot mechanism (Figs. 4 to 7) consisting of a traverse valve 130 and a slow feed valve 131 is provided for automatically actuating the piston 126 of the speed valve 122. The valves 130 and 131 preferably are built into an integral structure with the reverse and stop valves 55, 56 and 69, and hence respectively comprise vertical bores or chambers 132 and 133 opening through the plate 59. Of the bores 132 and 133, the lower ends are closed by plugs 134, and the upper ends are closed by sleeves 135. Slidably disposed in the respective bores 132 and 133 and extending upwardly through the sleeves 135 are two valve plungers 136 and 137 of the spool type formed respectively with longitudinally spaced peripheral collars or heads 138 and 139, and 140 and 141, defining annular spaces 142 and 143. The upper ends of the plungers 136 and 137 above the plate 59 are beveled to constitute abutments alternately responsive to the movements of the work carriage 22.

The pressure conduit 68 opens to the upper end portions of the bores 132 and 133 for connection thereto to supply pressure fluid when uncovered by lowering of the upper heads 138 and 140. The exhaust conduit 70 opens to the bores 132 and 133 constantly in communication with the spaces 142 and 143 for all positions of the plungers 136 and 137. A cross conduit 144 opens constantly from the upper end of the bore 132 above the head 138 to the lower end of the bore 133 and to the right end of the speed valve bore 123, and is adapted to be brought into communication either with the pressure conduit 68 or through a branch with the exhaust conduit 70 upon movement of the plunger 136 respectively into its lowermost or uppermost position. Likewise, a cross conduit 145 opens from the upper end of the bore 133 above the head 140 to the lower end of the bore 132 and the left end of the speed valve bore 123, and is adapted to be connected either with the high pressure conduit 68 or through a branch with the exhaust conduit 70 upon movement of the plunger 137 respectively into its lowermost or uppermost position.

The plungers 136 and 137 by reason of their upwardly projecting ends constitute differential pistons which will seek their uppermost positions when both ends or the lower ends are subjected to the high pressure in the conduit 68, and will take their lowermost positions when subjected to pressure on their upper ends only. It will be evident, that when the traverse plunger 136 is depressed, high pressure will be transmitted to both ends of the bore 133 and to the right end of the valve bore 123, thus positioning the valve piston 126 (Fig. 5) to effect rapid traverse of the work carriage 22 in a direction depending on the valve 36. The plunger 137 will occupy its uppermost position, thereby connecting the lower end of the bore 132 and the left end of the valve bore 123 to the exhaust conduit 70. If the feed plunger 137 is now depressed, the pressure conduit 68 will be connected to the lower end of the bore 132 and the left end of the bore 123. Thereupon, the traverse plunger 136 will be reset into operative position, and therethrough will connect the lower end of the bore 133 and the right end of the bore 123 to the exhaust conduit 70 so as to establish the plunger 137 in its lowermost position and effect movement of the piston 126 to the right (Figs. 6 and 7).

A plurality of dogs are mounted on the carriage 22 for actuating the plungers 136 and 137. Obviously, the dogs may be varied in number and location to obtain the desired carriage movements for a given problem. In the present instance, two fixed dogs 146 and 147 are mounted on the front of the table 22, for adjustment along the T-slot 78, in position to depress the traverse plunger 136 substantially simultaneously with or before each reversal of the carriage movement at the extreme limits of reciprocation. Two drop dogs 148 and 149, pivotally mounted respectively on plates 152 adjustably secured to the front of the carriage 22 along the T-slot 78, are located between the dogs 146 and 147, and are adapted respectively to depress the traverse plunger 136 to institute rapid traverse of the carriage 22 while the tools 27 and 30 successively are crossing the space between the holes B of the work piece A.

The dog 148 is limited against pivotal movement to the right past vertical position through engagement of a slot 150 therein with a pin 151 on its plate 152, but is free to pass over the plunger 136 upon movement with the carriage 22 to the right. Likewise, the dog 149 is limited against pivotal movement to the left past vertical position through engagement of a slot 153 therein with a pin 154 on its plate 152, but is free to flip over the plunger 136 upon movement with the carriage 22 to the left.

Four additional drop dogs 155, 156, 157 and 158 are pivotally mounted on plates 159 adjustably secured to the front of the carriage 22 along the T-slot 78 and between the reversing dog 76 and the stop dog 115. The two dogs 155 and 156 on the right have pin and slot connections 160 with the respective plates 159 preventing pivotal movement to the right past the vertical, and are adapted to successively depress the feed plunger 137 upon movement of the carriage 22 to the left to institute the slow feed while the tool 27 is operating in the work holes B. The two dogs 157 and 158 on the left have pin and slot connections 161 with the respective plates 159 limiting pivotal movement past the vertical to the left, and are adapted to depress the feed plunger 137 upon movement of the carriage to the right to effect a slow feed successively for engagement of the tool 30 with the holes B in the work A.

To provide means for restricting the discharge of exhaust fluid from the valve 122, so as to reduce the speed of the work carriage 22, the discharge passage 129 is adapted to be connected through an orifice or various combinations of orifices to the exhaust passage 128. To this end, a plurality of chambers or bores 162, two in the present instance, are formed in the bottom of the casing 38. The chambers 162 are interconnected by a passage 163 which is connected to the exhaust passage 128. The inner ends of the chambers 162 are connected respectively through spaced passages 164 and 165 to a transverse chamber or bore 166 which is formed in the casing 38 and is connected centrally through the passage 129 to the port 125. Adjustably threaded into the chambers 162 are two heads 167 provided with upstanding pins 168 extending across the passages 162 and 163 to define therewith restricted orifices 169 and 170.

It will be evident that fluid discharged from the port 125 in passing through one or both of the orifices 169 and 170 will be subjected to the flow law of orifices, and will therefore build up a back pressure checking the speed of the carriage 22 to a predetermined point. The pressure varies as the square of the volume of the fluid flowing through the orifices, and hence increased flow cannot take place unless the rate of travel of the carriage 22 is increased. The velocity of fluid flow past the orifices thus is proportional to the rate of travel of the carriage 22. The orifices serve to prevent any appreciable fluctuations in the predetermined slow speed of the carriage 22 otherwise tending to result from variations in resistance to the cutting action. It will be evident that the rate of feed is dependent upon the sizes of the orifices employed, and that different rates of feed may be obtained by selectively varying the number of orifices of the same or different sizes, connected in parallel at any one time. Obviously, the number, sizes and combinations of orifices can be indefinitely multiplied to obtain a wide and finely graduated range of feed adjustments.

Preferably, a slower feed is employed during the finishing cuts than during the roughing cuts. The orifice 169 which is intended to produce the slowest feed that may be desired in either direction of travel is constantly connected to the discharge port 125. To obtain a slightly faster feed during the roughing cut, the restricted orifice 170 is brought automatically into parallel with the orifice 169. The connection of the orifice 170 into or out of communication with the port 125 is automatically controlled by means of an orifice control valve 171 (Fig. 13) which comprises a valve piston 172 slidably disposed in the bore 166. The piston 172 is formed with a peripheral annular space 173 always establishing communication between the passages 129 and 164, and adapted when in its left-hand position also to connect the passage 165 with the passage 129 so as to obtain a faster feed.

The piston 172 is automatically moved from one position to the other upon each reversal of travel of the carriage 22. The pressure impulses are supplied through the conduits 71 and 72 which open respectively to the left and right ends of the bore 166. Thus, when the reverse plunger 60 is depressed to institute movement of the carriage 22 to the left, pressure fluid is supplied to the conduit 72 and acts to move the piston 172 to the left, thereby cutting in the orifice 170, to obtain a relatively fast feed during the roughing stroke (Fig. 6). Conversely, upon depressing the plunger 61 to reverse the movement of the carriage 22 to the right, the conduit 72 is connected to the exhaust conduit 70, and pressure fluid is supplied to the conduit 71 and acts to move the piston 172 to the right, thereby cutting out the orifice 170 to obtain a slow finishing feed (Fig. 7).

Preferably, the plate or apron 59 constitutes a control panel secured in the front wall of the base 20. Cover plates 174 and 175 are secured to the front and rear faces of the panel 59. A bracket 176 supporting the casing 38 on its underside is secured against the rear or inside face of plate 175. The passages serving the various valve units are formed mainly in the contacting surfaces of the parts 59, 174, 175, 176 and 38. Thus, all of the valves are built into an integral hydraulic structure which may be readily demounted as a unit from the machine by merely removing the plate 59. A cover plate 177 is secured to the base below the plate 59 to enclose the casing 38.

Movement of the carriage 22 as to direction and speed is under the control of selective dog actuated reset pilot mechanisms which are accurate, efficient and reliable in operation, and which are simple and compact in construction. Whenever either of the two actuators of each pilot mechanism is operated, the other actuator is automatically reset into position to assume control. By controlling the speed of travel of the carriage 22 through the rate of flow of the discharge fluid, a smooth and uniform operation is obtained. The orifice control, including the valve 171, affords means for varying the rate of feed in either direction to suit the depth of cut to be taken. The carriage may be operated continuously, or through a predetermined cycle under the control of the dog 115. The system is highly flexible and adaptable.

I claim as my invention:

1. A fluid control system for the movable element of a machine tool, comprising, in combination control means adapted to be mounted on said element for movement therewith, two pilot valves adapted to be mounted in fixed position in operative relation to said element, each valve comprising a casing and a valve member movable therein and projecting therefrom, each member having an inoperative position and an operative position for engagement by said means, pressure fluid passages cross-connecting said casings and controlled by said members to automatically effect return of either member into operative position upon movement of the other member into inoperative position by said means, and means operable by one of said members for controlling the movement of said element.

2. In combination with a reciprocable element of a machine tool, control means mounted on said element for movement therewith, and two spaced separate control devices mounted in fixed position relative to said element, each device comprising a movable abutment having an operative position in which it is engageable by said control means for movement into an inoperative position, each device controlling the other device to effect movement of one abutment into operative position upon movement of the other abutment out of operative position by said control means, said control means comprising two sets of a plurality of abutments spaced longitudinally of said element for coaction respectively with said devices, said devices and the abutments of both sets being aligned in a single plane longitudinally of said element, and means operable by one of said devices for controlling the rate of reciprocation of said element.

3. In an hydraulic system, in combination, a source of fluid under pressure, two valve casings formed respectively with valve cylinders, two valve pistons respectively reciprocable in said cylinders, each of said pistons having a reduced end projecting from the associated cylinder for outside actuation, and having two longitudinally spaced peripheral heads defining opposed differential pressure areas, a pressure fluid supply passage adapted to connect said source to the small ends of said cylinders when the associated pistons are in their innermost positions, a fluid exhaust passage opening from said cylinders intermediate said heads, and two fluid cross passages respectively opening from the large end of each cylinder to the other cylinder for connection to said supply passage upon movement of the associated piston in said other cylinder into its innermost position or to said exhaust passage upon movement of the latter outwardly.

4. In a fluid operating system for a machine tool, in combination, a piston and cylinder unit for reciprocating a movable machine tool element, fluid passages leading respectively to opposite ends of said unit, a source of fluid under pressure, a reversible reciprocatory direction valve having a closed central position in which it closes said passages and being operable upon movement into opposite extreme positions to connect said source alternately to said fluid passages, fluid pressure responsive means for actuating said valve selectively into either extreme position, independent fluid pressure responsive means for centering said direction valve, a fluid passage leading to said first mentioned pressure responsive means, a fluid passage leading to said last mentioned pressure responsive means, and a stop valve automatically operable upon movement of said element into a predetermined position to disconnect said second last mentioned passage from said source and to connect said source to said last mentioned fluid passage.

5. In a fluid operating system for a machine tool, in combination, a source of fluid under pressure, a reversible direction valve having fluid passages adapted for connection respectively to opposite ends of a piston and cylinder unit for reciprocating a movable machine tool element and having a closed central position in which it closes said passages and being operable upon movement in opposite directions to connect said source alternately to said fluid passages, fluid pressure responsive means for actuating said valve selectively into either extreme position, independent fluid pressure responsive means for centering said direction valve, a fluid passage leading to said first mentioned pressure responsive means, a fluid passage leading to said last mentioned pressure responsive means, an exhaust passage, and a stop valve movable in opposite directions to connect said last two mentioned fluid passages respectively and interchangeably to said source and exhaust passage.

6. In a machine tool, in combination, a movable machine element, a piston and cylinder unit for reciprocating said element, fluid passages leading respectively to opposite ends of said unit, a source of fluid under pressure, a reversible direction valve having a closed central position and being operable upon movement in opposite directions to connect said source alternately to said fluid passages, pressure responsive means for centering said direction valve, a fluid supply passage leading to said responsive means, a stop valve comprising a cylinder and a differential valve plunger in said cylinder, said source being connected through three branch passages respectively to said cylinder at opposite sides of said plunger and at an intermediate valve port, the reduced end of said plunger extending out of said cylinder for automatic actuation inwardly by said machine element upon movement of the latter into a predetermined position, a restricted orifice in the branch passage opening to said cylinder at the large end of said plunger, an exhaust passage, a hand valve operable at will to connect said cylinder at the large end of said plunger to said exhaust passage, said plunger upon movement inwardly serving to connect said port to said fluid supply passage, and when in its outermost position serving to connect said fluid supply passage to said exhaust passage.

7. In a machine tool, in combination, a movable machine element, a piston and cylinder unit for reciprocating said element, fluid passages leading respectively to opposite ends of said unit, a source of fluid under pressure, a reversible direction valve movable in opposite directions to connect said source selectively to said fluid passages to effect movement of said element alternately in opposite directions, and movable into an inoperative position to stop said element, pilot valve means for reversing said direction valve, a fluid supply passage leading to said means, a stop valve comprising a casing and a plunger in said casing, said source being connected to said casing through a valve port, one end of said plunger extending out of said casing for automatic actuation inwardly by said machine element upon movement of the latter into a predetermined position, an exhaust passage, said plunger upon movement inwardly serving to connect said supply passage to said exhaust passage, and when in its outermost position serving to connect said supply passage to said port, means operable upon inward movement of said plunger to effect movement of said direction valve into said inoperative position, and means for actuating said stop valve to return said plunger into extended position.

8. In a fluid operating system for a machine tool, in combination, a reversible direction valve having an inlet passage adapted for connection to a source of fluid under pressure and fluid passages adapted for connection respectively to opposite ends of a piston and cylinder unit for reciprocating a movable machine tool element, an exhaust passage opening from said valve, said valve being movable in opposite directions to connect said inlet passage alternately to said fluid passages, and the discharging passage of said fluid passages to said exhaust passage, a speed valve in said exhaust passage controlling the rate of fluid discharge from said unit, a pilot valve means adapted to be responsive to the movement of said element for reversing said direction valve, a pilot valve means adapted to be responsive to the movement of said element for adjusting said speed valve on occasion, a fluid supply passage leading to both pilot valve means, and a valve adapted for connecting said supply passage to said source.

9. In a machine tool, in combination, a source of fluid under pressure, a fluid passage, an exhaust passage, a valve comprising a casing and a differential plunger in said casing, said source being connected through three branch passages respectively to said casing at opposite sides of said plunger and at an intermediate valve port, the reduced end of said plunger extending out of said casing for outside actuation, said plunger when in its outermost position connecting said fluid passage to said port, a restricted orifice in the branch passage opening to the inner end of said casing, a hand valve comprising a casing and a valve plunger reciprocable therein, and a bleed passage connecting the inner end of said valve casing to said hand valve casing, said fluid passage opening to one end of said hand valve casing, said last mentioned plunger upon movement toward said end of said hand valve casing connecting said bleed passage to said exhaust passage.

10. In a machine tool, in combination, a movable machine element, a piston and cylinder unit for reciprocating said element, a source of fluid under a substantially constant pressure, a supply passage leading from said source, fluid passages leading to opposite ends of said unit, an exhaust passage, a direction valve for connecting said fluid passages respectively and reversibly to said supply and exhaust passages, pilot valve means responsive upon movement of said element into either end position to reverse said direction valve, two discharge passages, a speed-control valve for connecting said exhaust passage alternately to said discharge passages, pilot valve means responsive upon movement of said element into various predetermined positions to reverse said speed-control valve, two parallel restricted orifices adapted to be connected in one of said discharge passages, and a feed valve responsive to said first mentioned pilot means for selectively connecting one or both of said orifices in said last mentioned discharge passage.

11. In a machine tool, in combination, a movable machine element, a piston and cylinder unit for reciprocating said element, a source of fluid under a substantially constant pressure, a supply passage leading from said source, fluid passages leading to opposite ends of said unit, an exhaust passage, a direction valve for connecting said fluid passages respectively and reversibly to said supply and exhaust passages, a plurality of discharge passages, a speed-control valve for connecting said exhaust passage selectively to any one of said discharge passages, a plurality of parallel restricted orifices adapted to be connected in one of said discharge passages, and a feed valve for connecting said orifices in various combinations in said last mentioned discharge passage.

12. In a machine tool, in combination, a movable machine element, a piston and cylinder unit for reciprocating said element, a source of fluid under a substantially constant pressure, a supply passage leading from said source, fluid passages leading to opposite ends of said unit, an exhaust passage, a direction valve for connecting said fluid passages respectively and reversibly to said supply and exhaust passages, a plurality of parallel restricted orifices adapted to be connected in said exhaust passage, and a feed valve automatically operable upon each reversal of said element to vary the number of said orifices connected in said exhaust passage.

13. In a machine tool, in combination, a source of fluid under pressure, a supply passage opening from said source, a fluid passage, a valve having a pressure responsive plunger, means including a restricted orifice for directing pressure fluid from said supply passage to one end of said valve to urge said plunger into an operative position in which it connects said supply passage to said fluid passage, an exhaust passage, a hand valve having a pressure responsive valve member, said fluid passage being connected to direct pressure fluid to said hand valve against one end of said valve member to urge the latter out of an operative position in which it is adapted to connect said end of said first mentioned valve to said exhaust passage, and means for moving said valve member into operative position.

14. In a machine tool, in combination, a casing, a differential plunger reciprocable in said casing, a source of fluid under pressure, a supply passage opening from said source and terminating in a discharge port opening to said casing, a fluid passage having an inlet port opening from said casing, means for directing pressure fluid from said supply passage to said casing at opposite sides of said plunger to urge said plunger into an operative position in which it establishes communication to connect said supply passage and said fluid passage, means operable at will for dissipating the pressure fluid in said casing acting on the large side of said plunger to effect movement of said plunger out of operative position and thereby interrupt said communication, and means operatively connected to said fluid passage for actuation by fluid under pressure.

15. In a machine tool, in combination, two valves, each valve having a casing with a closed end and a differential valve plunger reciprocable therein and projecting from the other end thereof, a fluid pressure supply passage opening to said casings, an exhaust passage opening to said casings, and two passages cross-connecting said casings, each cross passage opening at one end to the closed end of one casing and at the other end to the other casing for connection to said supply passage or said exhaust passage respectively upon movement of the associated plunger inwardly or outwardly.

16. In a machine tool, in combination, two valves, each valve having a casing with a closed end and a valve plunger reciprocable therein and projecting from the other end thereof, a fluid pressure supply passage opening to said casings, and two passages cross-connecting said casings, each cross passage opening at one end to the closed end of one casing and at the other end to the other casing for connection to said supply passage upon movement of the associated plunger inwardly.

17. In a machine tool, in combination, two valves, each valve having a casing with a closed end and a differential valve plunger reciprocable therein and projecting from the other end thereof, a fluid pressure supply passage opening to said casings, an exhaust passage opening to said casings, two passages cross-connecting said casings, each cross passage opening at one end to the closed end of one casing and at the other end to the other casing for connection to said supply passage or said exhaust passage respectively upon movement of the associated plunger inward or outwardly, a movable member, a piston and cylinder unit operatively connected to said member, fluid passages connected to opposite ends of said unit, means including a reversible direction valve for controlling the supply and exhaust of pressure fluid selectively to and from said fluid passages, to effect movement of said member alternately in opposite directions, said cross passages being connected respectively to opposite ends of said direction valve, and means on said member for alternately moving said plungers inwardly.

18. In a machine tool, in combination, two valves, each valve having a casing with a closed end and a differential valve plunger reciprocable therein and projecting from the other end thereof, a fluid pressure supply passage opening to said casings, an exhaust passage opening to said casings, two passages cross-connecting said casings, each cross passage opening at one end to the closed end of one casing and at the other end to the other casing for connection to said supply passage or said exhaust passage respectively upon movement of the associated plunger inwardly or outwardly, and a reversible pressure fluid responsive member, said cross passages being connected respectively to opposite ends of said member.

19. In a machine tool, in combination, a movable machine element, a piston and cylinder unit for reciprocating said element, a source of fluid under a substantially constant pressure, a supply passage leading from said source, fluid passages leading to the opposite ends of said unit, an exhaust passage, a direction valve for connecting said fluid passages respectively and reversibly to said supply and exhaust passages, a plurality of parallel restricted orifices adapted to be connected selectively into said exhaust passage, and a feed valve automatically operable in response to the movement of said element to vary the connection of said orifices in said exhaust passage.

20. In a machine tool, in combination, a movable machine element, a piston and cylinder unit for reciprocating said element, a source of fluid under a substantially constant pressure, a supply passage leading from said source, fluid passages leading to opposite ends of said unit, an exhaust passage, a direction valve for connecting said fluid passages respectively and reversibly to said supply and exhaust passages, a plurality of restricted independently adjustable orifices adapted to be connected in said exhaust passage, and means for connecting said orifices selectively into said exhaust passage.

21. In a machine tool, in combination, a movable machine element, a piston and cylinder unit for reciprocating said element, a source of fluid under a substantially constant pressure, a supply passage leading from said source, fluid passages leading to opposite ends of said unit, an exhaust passage, a direction valve for connecting said fluid passages respectively and reversibly to said supply and exhaust passages, a plurality of discharge passages, a speed-control valve for connecting said exhaust passage selectively to any one of said discharge passages, a plurality of parallel restricted orifices adapted to be connected in one of said discharge passages, and means for connecting said orifices selectively into said last mentioned discharge passage, said means being automatically operable upon each reversal of said element to vary the selection of said orifices.

22. In combination with a movable element of a machine tool and a piston and cylinder unit for reciprocating said element, fluid passages adapted to lead respectively to opposite ends of said unit, an exhaust passage, a source of fluid under pressure, reversible direction valve means for connecting said fluid passages alternately to said source and to said exhaust passage, means adapted to be mounted for movement with said element for actuating said valve means, and second valve means adapted to be responsive to the movement of said element into predetermined positions for controlling the rate of flow through said exhaust passage, said two mentioned valve means being formed in a unitary sectional housing, passages to and from said valve means in said housing being formed by complementary grooves in the contacting faces of the sections of said housing.

23. In an hydraulic system, in combination, a source of fluid under pressure, two hydraulic valves connected to said source, two hydraulic motors for actuating said valves respectively, each valve having an operative position in which it is adapted for outside actuation, and an opposed position, and controlling the operation of the motor for the other valve, whereby actuation of either valve from the operative position into the opposed position will effect movement of the other valve from the opposed position into the operative position, and means reversibly operable in response to the adjustment of said valves.

24. In a machine tool, in combination, a reciprocable machine element, a piston and cylinder unit for reciprocating said element, fluid passages leading respectively to opposite ends of said unit, a source of fluid under pressure, a reversible direction valve operable upon movement into opposed end positions to connect said source selectively to said passages to effect movement of said element in opposite directions and having an intermediate neutral position for stopping said element, said valve comprising a casing and a reciprocatory valve member, means for actuating said member, two adjustable abutments having a projected position in which they act to confine said member in said neutral position and having a retracted position in which said member is free for actuation by said means, an exhaust passage, hydraulic means for moving said abutments simultaneously into projected position, and means for connecting said hydraulic means either to said source or said exhaust passage.

25. In combination with a hydraulic actuator for propelling machine parts and the like which includes a cylinder and piston construction, pumping means for delivering fluid under pressure for propelling purposes to said actuator, a main fluid control valve operatively connected therewith and including a reciprocable valve member for controlling the delivery of said fluid to said actuator, and a fluid control means including a restricted orifice, a less restricted orifice, and a valve having a reciprocable valve member for operatively connecting said restricted orifice to receive fluid discharged from said actuator when said actuator moves at a feeding rate and for operatively connecting said less restricted orifice to receive fluid discharged from said actuator when said actuator moves at a faster rate.

26. In a machine tool, in combination, a movable machine element, a piston and cylinder unit for reciprocating said element, a source of propelling fluid under pressure, and a fluid conducting system operatively connecting said source and said unit, said system including a direction valve having a chamber and a valve member reciprocably adjustable in said chamber and adapted to direct fluid from said source to one end of said unit and to direct fluid discharging from the other end of said unit during the travel of said element in one direction, a restricted passage and a relatively unrestricted passage in parallel and adapted selectively to receive the fluid discharging from said unit during said travel, and selective valve means for said passages, said valve means having a chamber and a valve member reciprocably adjustable in said last mentioned chamber and effective in one position of adjustment to cause the discharge of fluid through said restricted passage and in another position of adjustment to permit the discharge of fluid through said unrestricted passage.

27. In a machine tool, in combination, a reciprocable machine tool element, a piston and cylinder unit for reciprocating said element, pumping means for delivering liquid fluid under pressure, and a fluid conducting system operatively connecting said pumping means and said unit, said system including a direction valve having a valve member reciprocably adjustable and adapted in one position of adjustment to direct fluid from said pumping means to one end of said unit and to direct fluid discharging from the other end of said unit during the travel of said element in one direction, and in another position of adjustment to direct fluid from said pumping means to the other end of said unit and to direct fluid discharging from said one end of said unit during the travel of said element in a reverse direction, means automatically operable upon travel of said element in said reverse direction into a predetermined position to adjust said valve member from said other position into said one position, a restricted passage and a relatively unrestricted passage in parallel and adapted selectively to receive the fluid discharging from said unit during travel of said element in said one direction, selective valve means for said passages and having a valve member reciprocably adjustable and effective in one position of adjustment to cause the discharge of fluid through said restricted passage and in another position of adjustment to permit the discharge of fluid through said unrestricted passage, and means including an actuating dog movable with and selectively adjustable in relation to said element and being automatically operable to adjust said last mentioned valve member upon movement of said element into a predetermined position of travel.

28. In a hydraulic transmission for a reversible machine tool element, in combination, a constant displacement pump for providing a source of fluid under pressure and having a discharge passage, a spring-closed adjustable working-pressure relief valve connected to said discharge passage and adapted to open in response to a predetermined pressure in said passage and to divert excess fluid from said passage to maintain said pressure substantially constant, a reversible hydraulic motor for driving said element and having supply passages opening to opposite sides respectively and reversibly to receive and exhaust fluid, a relatively restricted exhaust passage, a relatively less restricted exhaust passage, and control means operable to connect said discharge passage selectively to either of said supply passages and to direct fluid discharging from the other of said supply passages during operation of said motor in either direction selectively through only said restricted exhaust passage or through said less restricted passage, said relief valve being open when the exhaust fluid is directed through only said restricted passage to cause said element to travel at a relatively slow rate.

29. In a hydraulic transmission for a reversible machine tool element, in combination, a constant displacement pump for providing a source of fluid under pressure and having a discharge passage, a spring-closed adjustable working-pressure relief valve connected to said discharge passage and adapted to open in response to a predetermined pressure in said passage and to divert excess fluid from said passage to maintain said pressure substantially constant, a reversible hydraulic motor for driving said element and having supply passages opening to opposite sides respectively and reversibly to receive and exhaust fluid, a relatively restricted exhaust passage, a relatively less restricted exhaust passage, and control means automatically operable in response to movement of said element into different predetermined positions to connect said discharge passage reversibly to either of said supply passages and to direct fluid discharging from the other of said supply passages during operation of said motor in either direction selectively through only said restricted exhaust passage or through said less restricted passage, said relief valve being open when said fluid is directed through only said restricted passage to cause said element to travel at a slow rate.

30. In a hydraulic transmission for a reversible machine tool element, in combination, a source of fluid under pressure having a discharge passage and being responsive to the pressure in said passage to vary the volume of fluid available as required to maintain said pressure substantially constant, a reversible hydraulic motor for driving said element and having supply passages opening to opposite sides respectively and reversibly to receive and exhaust fluid, a relatively restricted exhaust passage, a relatively less restricted exhaust passage, and control means operable to connect said discharge line selectively to either of said supply lines and to direct the fluid discharging from the other of said passages upon operation of said motor in either direction selectively through only said restricted passage or through said less restricted passage, whereby the selection of said exhaust passages permits of a predetermined program of fast and slow movements of said element in either direction of operation.

31. In a fluid operating system for a machine tool, in combination, a direction valve having fluid passages adapted for connection to opposite ends of a piston and cylinder unit for reciprocating a movable machine tool element and having an inlet passage for receiving fluid under a substantially constant pressure and having an exhaust passage, said valve being operable to connect said fluid passages respectively and interchangeably to said supply and exhaust passages, a plurality of restricted independently adjustable orifices adapted to be connected in said exhaust passage, and means for connecting said orifices selectively into said exhaust passage.

32. In a hydraulic transmission for a reversible machine tool element, in combination, a constant displacement pump for providing a source of fluid under pressure and having a discharge passage, a spring-closed adjustable working-pressure relief valve connected to said discharge passage and adapted to open in response to a predetermined pressure in said passage and to divert excess fluid from said passage to maintain said pressure substantially constant, supply passages adapted to open respectively to opposite sides of a reversible hydraulic motor for driving said element, said passages being adapted respectively and interchangeably to receive and exhaust fluid, a relatively restricted exhaust passage, a relatively less restricted exhaust passage, and control means operable to connect said discharge passage selectively to either of said supply passages and to direct fluid discharging from the other of said supply passages during operation of said motor in either direction selectively through only said restricted exhaust passage or through said less restricted passage, said relief valve being open when the exhaust fluid is directed through only said restricted passage to cause said element to travel at a relatively slow rate.

CARROLL R. ALDEN.